United States Patent [19]

Talmadge et al.

[11] Patent Number: 4,464,051
[45] Date of Patent: Aug. 7, 1984

[54] SPECTROPHOTOMETER

[75] Inventors: Paul C. Talmadge, Ansonia; Joseph A. Vergato, W. Redding, both of Conn.

[73] Assignee: The Perkin-Elmer Corporation, Norwalk, Conn.

[21] Appl. No.: 354,254

[22] Filed: Mar. 2, 1982

[51] Int. Cl.³ .............................. G01J 3/08; G01J 3/42
[52] U.S. Cl. .................................................. 356/323
[58] Field of Search ........................ 356/319, 323–325, 356/332–334

[56] References Cited

U.S. PATENT DOCUMENTS

| | | | |
|---|---|---|---|
| 2,879,393 | 3/1959 | Cary et al. | 356/324 |
| 3,462,227 | 8/1969 | Tipotsch | 356/332 |
| 3,542,480 | 11/1970 | Ford . | |
| 4,121,145 | 10/1978 | Talmadge | 318/696 |
| 4,305,663 | 12/1981 | Perkins et al. | 356/323 |

Primary Examiner—F. L. Evans
Attorney, Agent, or Firm—F. L. Masselle; E. T. Grimes; R. A. Hays

[57] ABSTRACT

Disclosed herein is a spectrophotometer which includes a source of radiation; an optical system for forming a beam of radiation from the source and directing it along a sample path and along a reference path, which paths come together at a location to form a combined path that impinges on a detector; a chopper mounted at said location for successively directing one or the other of the beams along the combined path or providing a blank chopper area for blocking radiation from the combined path; a monochromator having a grating and slits disposed in the combined path, the angular position of the grating being adjustable for passing selected successive wavelengths of radiant energy through the optical system; and controls are provided for controlling the movement of the grating and/or slits so that movement only occurs when the blank chopper area is blocking the combined path.

5 Claims, 5 Drawing Figures

SPECTROPHOTOMETER

BACKGROUND OF THE INVENTION

This invention relates to spectrophotometer and more particularly to ratiometric type spectrophotometers.

A ratiometric spectrophotometer system is one which takes the ratio between the sample and the reference beams, as contrasted to an optical null system, which takes and adjusts a mechanical optical attenuator in and out of the reference beam to match the radiation through the sample area. In the ratiometric spectrometer system there are two clear optical paths and they come together and impinge on one detector. A chopper is provided so that the detector sees the reference, the sample and a blank area, which is the background radiation in the system. That is, there is a comparison of those three levels, the background radiation, the sample radiation and the reference radiation.

Now what happens is that the sample radiation is taken and the background radiation is subtracted from it to give an absolute amplitude. Then the background radiation is subtracted from the reference radiation to obtain a corrected reference, which is divided into the corrected sample radiation to obtain the required ratio of sample to reference transmission.

Heretofore, attempts have been made to try to move various elements in the spectrophotometer in unison by means of cams, but difficulties were experienced. Stop-start repeatability could not be obtained because of the inertia involved. In addition, it was difficult and time consuming to accurately fabricate the cam surfaces.

Heretofore problems were caused by so called "uncompensation". Uncompensation comes about in monochromators because the sample looks at one wavelength of information and the reference looks at a second piece of information which is not at the same wavelength. As a result, when there are real sharp bands like in carbon dioxide or water vapor bands they pick up unequal results and it looks like noise. That is, observation is made high on the side of a sharp end for the reference and low for the sample so that the two readings are not functionally what one would like to know.

In summary, a problem with the ratiometric spectrophotometer resides in the fact that, if the grating is in motion while spectral information is being gathered, a significant degradation in the resultant signal occurs.

SUMMARY OF THE INVENTION

In achieving the foregoing and other objectives, the spectrophotometer according to the present invention provides, in combination, a source of radiation, an optical system for forming a beam of radiation from the source and directing it along a sample path and along a reference path, which paths come together at a location to form a combined path that impinges on a detector. Chopper means are mounted at said location for successively directing one or the other of the beams along said combined path or providing a blank chopper area for blocking radiation from said combined path. Monochromator means are provided having grating means mounted in said combined path, and means are provided for adjusting the angular position of said grating means for passing selected successive wavelengths of radiant energy through said optical system. Further, control means are provided for controlling the movement of the means for moving the grating so that movement only occurs when the blank chopper area is blocking said combined path.

According to one aspect of the invention, the chopper means has a cycle that successively in the order of occurrance consists of six positions: a blank, a reference, a sample, a blank, a sample, a reference and the cycle is repeated with another blank.

According to another aspect of the invention the control means is a microprocessor, and the chopper means inputs to said microprocessor one pulse for each position of the chopper blade.

According to still another aspect of the invention the control means includes a microprocessor and the chopper means includes a chopper motor controller and a chopper motor. Further, the system includes a master timer for inputting timing signals to said chopper motor controller and into said microprocessor, said chopper motor controller being arranged to input into the microprocessor a plurality of pulses per cycle, one corresponding to each position of the chopper, and said chopper motor being arranged to input into said microprocessor one sync pulse per cycle.

According to a further feature of the invention, the spectrophotometer includes a monochromator adjustable slit means and means for adjusting the slit means. The control means for controlling the movement of the means for moving the grating also controls the movement for adjusting the slit means so that movement only occurs when said blank chopper area is blocking the combined path.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the various purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings forming a part of the specification.

DETAILED DESCRIPTION OF A PREFERRED EMBODIMENT

Figure 1:
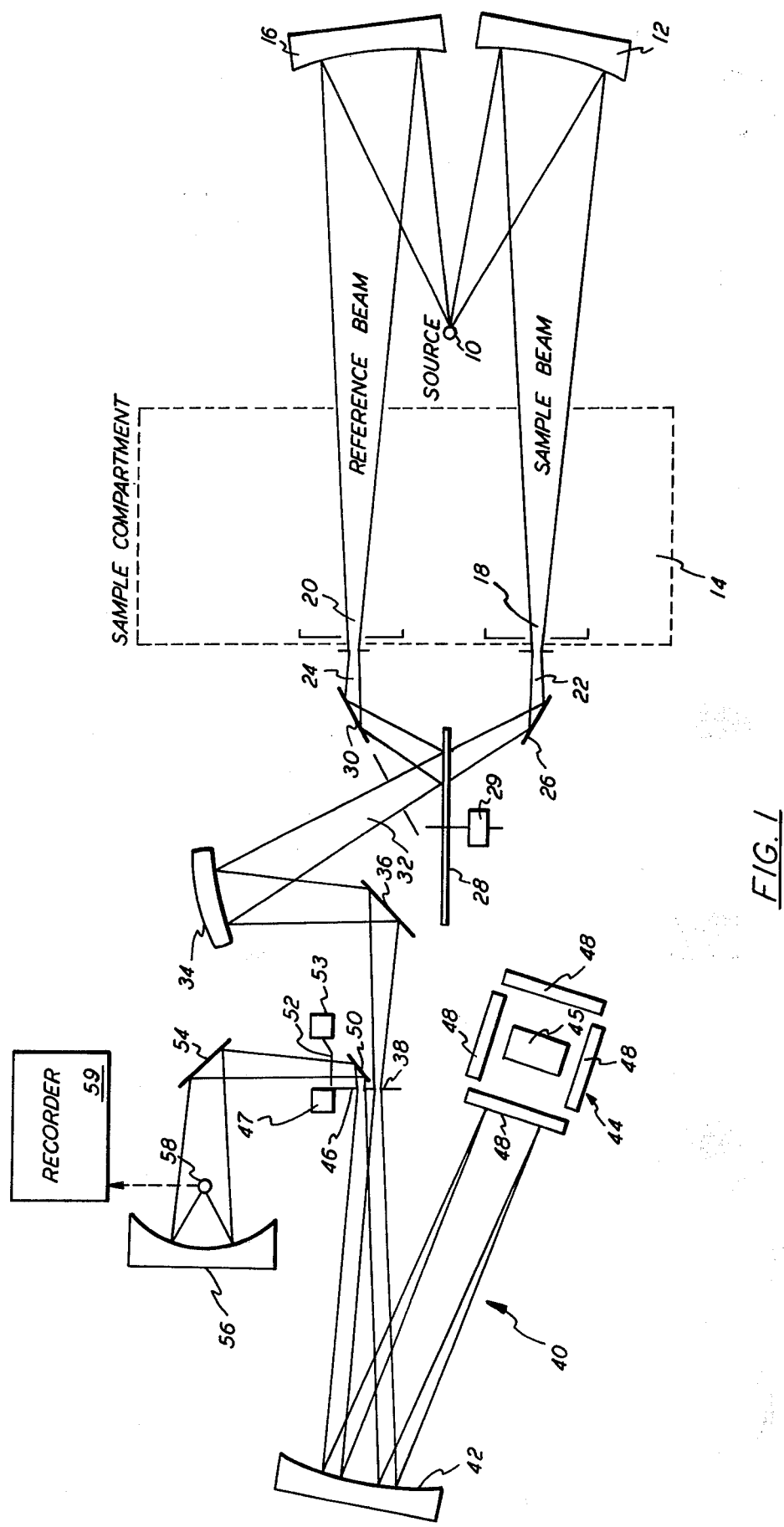
FIG. 1 is a block diagram of the optical system of the present invention.

Turning first to FIG. 1, radiation from an infrared source 10 is directed by a spherical mirror 12 through a sample compartment 14. Also, radiation from the source 10 is directed by mirror 16 through the sample compartment 14. A sample whose characteristic absorption of radiation is to be measured is normally placed at 18 whilst a reference material may be placed in the other beam as at 20, thereby forming a so called "sample beam" 22 and a "reference beam" 24. The sample beam 22 is folded by a plane mirror 26 and directed to a chopper assembly 28 driven by chopper motor 29, while the reference beam 24 is folded by a plane mirror 30 to the chopper assembly 28. The chopper assembly comprises a three bladed rotating sector mirror, i.e., a blank space every 60° and a mirror sector every 60°. Superimposed on that is a two bladed rotor that has two 60° sectors disposed 180° apart mounted so that one of the sectors covers an open area in the sector mirror and the other one covers a reflective area in the sector mirror. As a result the chopper assembly, in effect, includes six sectors and therefore has six outputs or positions. For each cycle a sample beam 22 passes through the chopper two times and the reference beam 24 is reflected two times by the chopper. In addition, two times each cycle the chopper shows blanks so that neither the reference beam nor the sample beam is outputted from the chopper. This is also referred to as dark cycle or dark time of the cycle. FIG. 3A of the drawings shows the chopper cycle wherein the chopper positions are indicated as follows: R for reference; S for sample; B for blank. The positions in their order of occurrence are a blank, a reference, a sample, a blank, a sample, a reference and the cycle is repeated with another blank.

The output from the chopper assembly, as indicated at 32, passes through a toroidal mirror 34 where it is reflected back to a plane mirror 36 which directs it to the entrance slit 38 of a monochromator indicated generally at 40. In the monochromator, the beam of radiation passes to a paraboloidal mirror 42 which directs it to a grating assembly indicated at 44 and back to the mirror 42 and thence to an exit slit 46. The widths of the entrance slit 38 and exit slit 46 are controlled by slit motor 47. The grating is driven by grating motor 45. In the illustrated embodiment, the grating assembly 44 includes four grating elements 48, which are successively rotated into operative position in a stepwise manner. In addition, when in operative position, the angle of the grating is changed in a stepwise manner. The angular change is not constant, because the dispersion angle changes as a function of the wavelength and it is desirable to move at a constant wavenumber increment.

The beam of radiation passing out the exit slit 46 of the monochromator 40 is reflected by a plane mirror 50 and passed through a filter wheel 52 to another plane mirror 54. The filter wheel is rotated by filter motor 53. The light folded by the mirror 54 is reflected by an ellipsoidal mirror 56 to a detector 58, which produces an electrical signal output recorded on a recorder 59 that is a function of the intensity of the instantaneous radiation incident thereon.

The difficulty in a ratiometric spectrophotometer is that if the grating is in motion while spectral information is being gathered, a significant degradation in the resultant signal occurs. Applicants have discovered that dark cycle stepping eliminates this problem. By moving the grating only during the so-called dark cycle, no motion occurs during either the sample or reference gathering periods. That is, the motion takes place during a period when the chopper is looking at a blank chopper area, which is roughly at room ambient radiation. What has been accomplished is that the monochromator is digitally synchronized with the chopper rotation.

Figure 2:
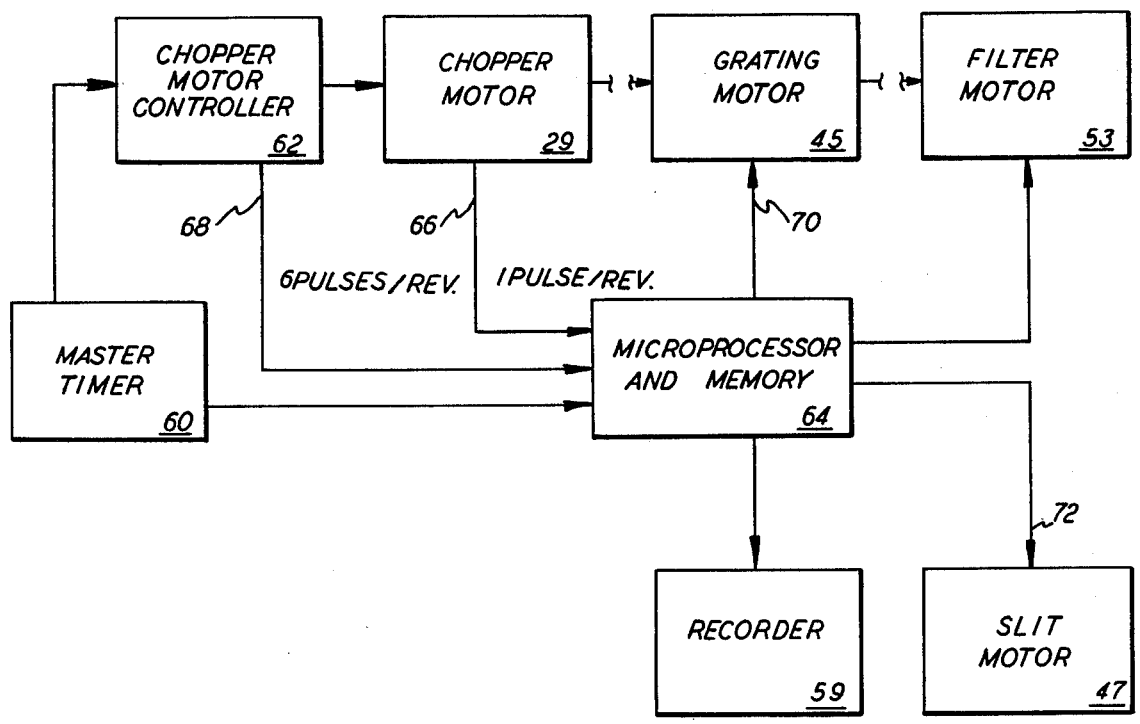
FIG. 2 is a block diagram of the electrical system of the invention.

Referring now to FIG. 2, there is shown a master timer 60, which is a crystal controlled clock that sends inputs to the chopper motor controller 62 and to a microprocessor and memory 64 to synchronize the operation of the various moving elements with the speed of the chopper motor 29. The chopper motor controller 62 directs the chopper motor 29 to rotate at a constant speed, which in the illustrated embodiment is about 8.33 revolutions per second. The chopper motor 29 is provided with a sync output 66, which is an optical pick-off such as a detector in line with a light beam that is interrupted by a disc rotatable with the motor shaft. This sync line outputs a sync signal 67 once per revolution to the microprocessor 64, as is shown in FIG. 3B. The chopper motor controller 62 is provided with an output line 68 connected to the microprocessor 64. This line outputs six pulses per revolution with each pulse corresponding to a position of the chopper, as shown at 69 in FIG. 3C.

Figure 3:
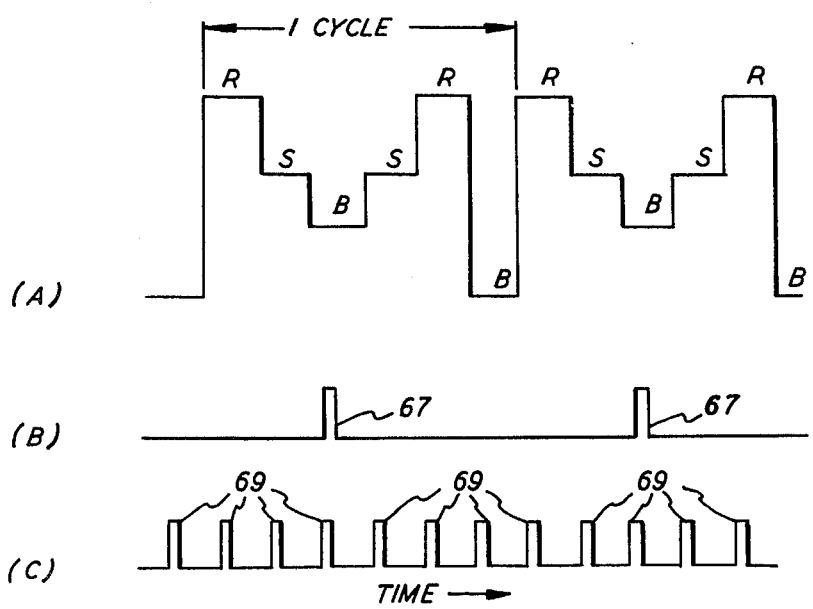
FIG. 3A is a graph showing the chopper cycle of the invention.
FIG. 3B is a graph showing the sync cycle.
FIG. 3C is graph showing the chopper pulse signals.

The microprocessor 64 controls everything that runs in the system except the chopper motor 29. The chopper motor signals synchronize the microprocessor's data handling circuitry such that the control of the grating motor 45 is synchronized to the chopper's rotation. The once per revolution signal 66 initializes a counter in the microprocessor and that counter counts essentially the six positions of the chopper. The microprocessor is operative to effect a routine so that only when it knows that the chopper is on blank or so-called dark cycle it sends a set of states to the grating motor via line 70 to step the grating motor the necessary distance and thereby change the grating angle to change the wavelength of the radiation under consideration. In operation, this grating motor may be started and stopped every 60 milliseconds. A suitable stepping motor for this installation is described in U.S. Pat. No. 4,121,145, issued Oct. 17, 1978 to Paul Conway Talmadge. It will be appreciated, as is apparent from FIG. 3 that there is a phase difference between the sync signal 67 in FIG. 3B and the pulse signal 69 in FIG. 3C with respect to the chopper positions as illustrated in FIG. 3A. The reason for this is that it is easier and less expensive in this particular installation to manufacture a disc that puts the signal in the middle than to put it on the edge. However, a delay counter in the microprocessor actually phases the incoming signals to the actual data so that the output signals or pulses on line 70 are such that the grating motor is truly moved at the beginning of the dark or blank cycle position. Thus, in effect, you are retiming the signals over such that they come in line with the beginning edge of the chopper position. It will be further appreciated that all of the positions on the chopper assembly cannot be physically equal, as there are always mechanical tolerances. This is compensated for in the microprocessor. Thus, there is a time window that the microprocessor looks at which takes into consideration the error distribution of all of the mechanical components so that the time window is within the mechanical tolerances of the chopper construction. As a result there is a built in approximately 5% window on each one of the transition points that is not observed by the microprocessor taking data. This overcomes the problem associated with tolerances.

In addition, the slit motor 47 is also changed in the dark cycle or blank portion of the chopper so that you do not have slit change errors in the signal path. This is effected by pulses outputted from the microprocessor and memory 64 via line 72, which are outputted responsive to the position to the chopper assembly as inputted to the microprocessor in the manner discussed above in connection with the timing of the grating movement.

With respect to the changing of the filters via filter drive motor 53 or the changing of one grating element 48 to another, the microprocessor 64 outputs a signal to the recorder 59 to terminate recording during the changeover time interval. As a result, everything is synchronized in this system to the chopper 29, so that no ratiometric data is taken during a mechanical adjustment of the monochromator or filter.

Although a certain particular embodiment of the invention has been herein disclosed for purposes of explanation, various modifications thereof, after study of the specification, will be apparent to those skilled in the art to which the invention pertains.

What is claimed is:

1. A spectrophotometer comprising, in combination:
    a source of radiation;
    an optical system for forming a beam of radiation from said source and directing it along a sample path and along a reference path, which paths come together at a location to form a combined path that impinges on a detector;
    chopper means mounted at said location for successively directing one or the other of said beams along said combined path or providing a blank chopper area for blocking radiation from said combined path, said chopper means including a chopper motor controller and a chopper motor
    monochromator means having grating means mounted in said combined path, means for adjusting the angular position of said grating means for passing selected successive wavelengths of radiant energy through said optical system;
    control means for controlling the movement of said means for moving the grating so that movement only occurs when said blank chopper area is blocking said combined path, said control means including a microprocessor and memory, and
    a master timer for inputting timing signals to said chopper motor controller and to said microprocessor, said chopper motor controller being arranged to input into said microprocessor a plurality of pulses per cycle, one corresponding to each position of the chopper, said chopper motor being arranged to input into said microprocessor one sync pulse per cycle.

2. A spectrophotometer according to claim 1 wherein said chopper means has a cycle that successively in the order of occurrence consists of six positions, a blank, a reference, a sample, a blank, a sample, a reference and the cycle is repeated with another blank.

3. A spectrophotometer according to claim 1 wherein said plurality of pulses is six pulses per cycle.

4. A spectrophotomer according to claim 1 or claim 3 wherein said microprocessor is operative to adjust for the phase difference in the pulses received with respect to the actual position of said chopper means.

5. A spectrophotomer according to claim 1 further including monochromator adjustable slit means, means for adjusting said slit means, and wherein said control means for controlling the movement of said means for moving the grating also controls said means for adjusting said slit means so that movement only occurs when said blank chopper area is blocking said combined path.

* * * * *